July 18, 1933.  W. GENSECKE  1,918,638
PROCESS AND APPARATUS FOR SEPARATING SOLVENTS FROM THEIR MIXTURES
WITH OIL OR FAT IN VACUO BY EVAPORATION OF THE SOLVENTS
Filed Dec. 31, 1931

Inventor:
Wilhelm Gensecke,
By Byrnes, Townsend & Potter
Attorneys.

Patented July 18, 1933

1,918,638

UNITED STATES PATENT OFFICE

WILHELM GENSECKE, OF GONZENHEIM NEAR FRANKFORT-ON-THE-MAIN, GERMANY, ASSIGNOR TO AMERICAN LURGI CORPORATION, OF NEW YORK, N. Y., A CORPORATION OF NEW YORK

PROCESS AND APPARATUS FOR SEPARATING SOLVENTS FROM THEIR MIXTURES WITH OIL OR FAT IN VACUO BY EVAPORATION OF THE SOLVENTS

Application filed December 31, 1931, Serial No. 584,242, and in Germany March 12, 1931.

The present invention relates to the separation of solvents from oil or fat dissolved therein by evaporation of the solvents. The invention is particularly applicable to processes for recovering oils and fats from seeds by extraction with a solvent, preferably, for instance with benzine. A mixture of a solvent with oil or fat is generally termed "miscella".

The elimination of the solvent from the miscella has hitherto generally been carried on by evaporating the solvent at an ordinary atmospheric pressure. This treatment however has the disadvantage, that for the removal of the last traces of the solvent fairly high temperatures are required, which cause the oil to get contaminated by dissolving impurities.

Vacuum plants for lowering the evaporating temperature by evaporation of the solvent in vacuo have already been designed. Such plants however have the disadvantage of entailing a very great loss of solvents. If the vapours are condensed in a surface condenser, considerable quantities of these vapours are drawn into the air-pump without being condensed.

It is possible to improve the condensation by using spray condensers for precipitating the vapours of the solvents, but then losses will be caused through considerable quantities of benzine being dissolved or mechanically carried away by the spraying water.

According to the present invention the distillation of the solvent is carried on by utilizing the advantages of the system of spray condensation, avoiding however the losses which are entailed by employing the arrangement generally used. The invention is characterized by the vapours of the solvent being condensed by direct contact with circulating water, and by carrying away the heat absorbed in the circuit of water at a suitable place of the circuit, for instance in a cooled surface apparatus.

The surface apparatus may be cooled with water. If however the temperature of the obtainable cooling water is too high, or if an intense cooling effect is desired, the surface apparatus may be designed for serving as an evaporator, connected with a steam-condenser by a lifting arrangement increasing the pressure. In this manner any desired temperature below the temperature of the obtainable cooling water may be maintained in the cooler for the water-circuit.

Figure 1:
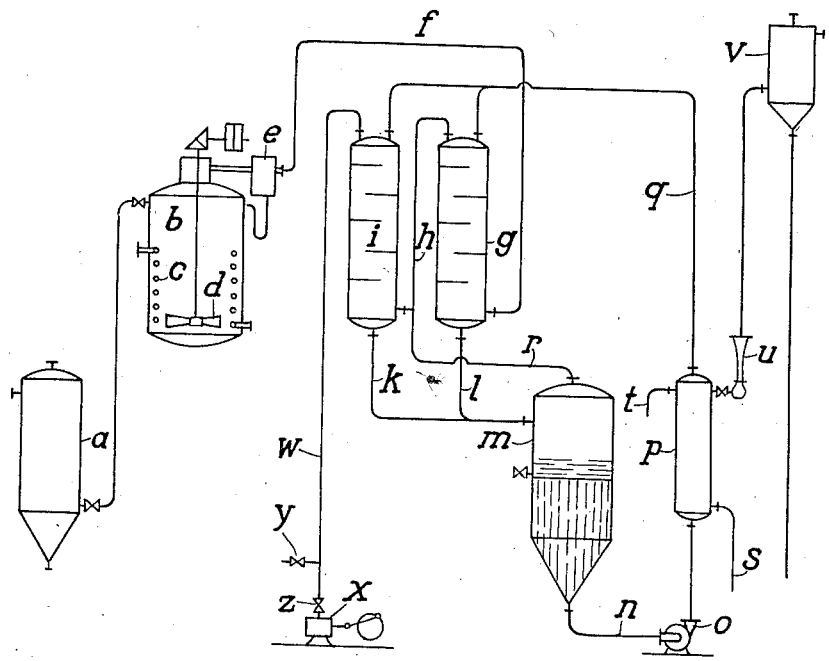

In the drawing, Fig. 1 is a diagrammatic illustration of the apparatus used in carrying out the invention.

Figure 2:
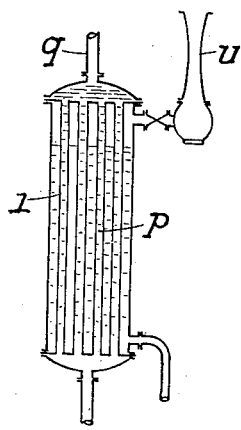

Fig. 2 is a sectional view of the cooler $p$.

In the accompanying drawing, illustrating a plant according to the invention by way of an example, $a$ is a reservoir for the miscella to be treated. The latter is brought from the reservoir into the evaporator $b$, for instance by suction. The evaporator $b$ is fitted with a heating coil $c$ and with a stirrer $d$. After passing a separator $e$ and a conduit-pipe $f$ the vapours of the solvent formed in the evaporator $b$ enter the condenser for the solvent $g$, and, passing through a conduit-pipe $h$, a second condenser for the solvent $i$. The circulation of the cooling water required for the condensers $g$ and $i$ is maintained by a pump $o$, which passes the water through a cooler $p$ and conduit-pipes $q$ into the condensers $g$ and $i$. From here the water flows through conduit-pipes $k$ and $l$ into a separating tank $m$, in which the separation of the water from the condensed benzine takes place. $r$ is a connecting pipe between the separating tank $m$ and the condensers for the solvent, serving for adjusting the vacuum. From tank $m$ the water returns through the conduit-pipe $n$ to the pump $o$, thus closing the circuit.

In many cases the cooler $p$ may be water-cooled, the water entering at $s$, and leaving through the conduit-pipe $t$. If it is desired to attain in the cooler $p$ a temperature below that of the obtainable cooling-water, the cooler for the circuit-water may be designed to serve as an evaporator, for instance by connecting it with the water-cooled condenser $v$ by a lifting arrangement increasing the pressure, preferably by an injecting apparatus $u$. In this manner it is possible to maintain a temperature in the cooler $p$, for example, as low as 0° C., even if the temperature of the cooling-water be about 25° C.

Figure 2 shows the cooler $p$ in a somewhat larger scale, as an example how it may be designed to serve as an evaporator. The cooled circuit-water passing into the cooler from the pump *o*, flows through the cooling-tubes 1. The latter are at their outside in contact with flowing water, which, under the action of the injector *u* and the cooler *v*, evaporates at a low temperature, thus cooling the circuit-water down to any desired temperature.

The condensers are, by a conduit-pipe *w*, connected with an air-pump *x*, by which the vacuum for working the plant is created and maintained. For adjusting the vacuum to a desired degree, the suction-pipe *w* of the pump is fitted with an air-valve *y*, instead of which however a throttling-valve *z* may be fitted. Alternatively both these devices may be provided.

The water-circuit may alternatively be arranged in such a manner, that for each of the two coolers *g* and *i* a separate water-circuit is provided, for instance by cooling the condenser *g* with circulating water cooled by ordinary cooling-water, while for the condenser for solvents *i* cooled water of a low temperature is used, in order to reduce the loss of solvents to a minimum.

I claim:

1. A process of separating a solvent from oil or fat dissolved therein which comprises vaporizing the solvent, condensing the resulting solvent vapors by direct contact with a cooling liquid not miscible therewith, separating the condensed solvent from the cooling liquid, lowering the temperature of the cooling liquid by surface cooling and returning the cooling liquid to the condensing operation, said cooling liquid moving in a closed circuit.

2. A process of separating a solvent which is not miscible with water from oil or fat dissolved therein which comprises vaporizing the solvent, condensing the resulting solvent vapors by direct contact with water, separating the condensed solvent from the water, lowering the temperature of the separated water by surface cooling with a cooling agent which is evaporated at a low temperature under a high vacuum, and using the water for condensation of further quantities of solvent vapors in the closed cycle.

3. A process of separating a solvent from oil or fat dissolved therein which comprises vaporizing the solvent, condensing the resulting solvent vapors by direct contact with water in at least two stages, the solvent vapors passing in series through said stages, separating the condensed solvent from the water, the water used in the first condensation stage being cooled by surface cooling with water at ordinary temperature and the water used in the second condensation stage being cooled by surface cooling with water whose temperature is lowered by evaporating it at reduced pressure, and then returning the cooled water to the condensing stages.

4. Apparatus for separating a solvent from oil or fat dissolved therein, comprising an evaporator for the solvent, a spray condenser for condensing the solvent vapors, means for conducting solvent vapors from the evaporator into the condenser, means for introducing water into the condenser, a gravity separator, means for passing the condensed solvent and water from the condenser into the separator, a surface cooler, means for passing the water from the separator into the surface cooler, means for passing the water from the surface cooler into the condenser, a barometric condenser and an injector pump whose suction side is connected to the cooling space of the surface cooler and whose pressure side is connected to the barometric condenser.

WILHELM GENSECKE.